US008406131B2

(12) United States Patent
Kotrla et al.

(10) Patent No.: US 8,406,131 B2
(45) Date of Patent: Mar. 26, 2013

(54) SYSTEM AND METHOD FOR MONITORING AND ANALYZING NETWORK TRAFFIC (75) Inventors: Scott R. Kotrla, Wylie, TX (US); Christopher N. DelRegno, Rowlett, TX (US); Matthew W. Turlington, Richardson, TX (US); Michael U. Bencheck, Richardson, TX (US); Richard C. Schell, Allen, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 468 days.

(21) Appl. No.: 12/191,557

(22) Filed: Aug. 14, 2008

(65) Prior Publication Data
US 2010/0039957 A1    Feb. 18, 2010

(51) Int. Cl.
*G01R 31/08* (2006.01)
(52) U.S. Cl. .................................. 370/230.1
(58) Field of Classification Search ............... 370/233, 370/253, 232, 229, 230, 252, 235, 389, 391
See application file for complete search history.

(56) References Cited

U.S. PATENT DOCUMENTS

| 6,058,102 | A | 5/2000 | Drysdale et al. |
| 6,377,583 | B1 | 4/2002 | Lyles et al. |
| 6,721,315 | B1 * | 4/2004 | Xiong et al. ................. 370/389 |
| 7,543,052 | B1 * | 6/2009 | Cesa Klein .................. 709/224 |
| 7,577,736 | B1 * | 8/2009 | Ovenden ..................... 709/224 |
| 7,652,988 | B2 * | 1/2010 | Jain et al. ..................... 370/230 |
| 2002/0018473 | A1 * | 2/2002 | Hassell et al. ............ 370/395.1 |
| 2004/0257999 | A1 | 12/2004 | MacIsaac |
| 2005/0265253 | A1 | 12/2005 | Swift et al. |
| 2007/0153796 | A1 * | 7/2007 | Kesavan et al. .............. 370/392 |
| 2008/0008095 | A1 * | 1/2008 | Gilfix ........................... 370/235 |
| 2008/0095053 | A1 * | 4/2008 | Chen et al. ................. 370/230.1 |

FOREIGN PATENT DOCUMENTS
WO    WO-03/039074    5/2003

* cited by examiner

*Primary Examiner* — Kwang B Yao
*Assistant Examiner* — Anh Ngoc Nguyen (57) ABSTRACT

An approach is provided for monitoring and analyzing network traffic. Traffic is monitored during a configurable time interval. A number of bursts associated with the traffic are tracked. A measured traffic rate is generated based on the number of bursts occurring within the time interval. The measured traffic rate is compared with a committed rate to determine if the measured traffic rate exceeds the committed rate.

23 Claims, 9 Drawing Sheets

| DATA UNIT NUMBER | DATA UNIT TIMESTAMP | DATA UNIT LENGTH |
|---|---|---|
| 1 | 0 | 64 |
| 2 | 0.01 | 69 |
| 3 | 0.01 | 64 |
| ... | ... | ... |
| 320 | 0.19 | 78 |
| 321 | 0.19 | 78 |
| 324 | 0.19 | 78 |
| 325 | 0.19 | 78 |
| 326 | 0.19 | 78 |
| 327 | 0.19 | 78 |
| 328 | 0.19 | 1510 |
| 329 | 0.19 | 77 |
| 330 | 0.19 | 64 |
| 331 | 0.19 | 64 |
| 332 | 0.19 | 69 |
| ... | ... | ... |
| $DUN_N$ | $DUT_N$ | $DUL_N$ |

| CLIENT | MONITORED TIME INTERVAL (SECONDS) | MONITORED TRAFFIC (MBITS) | AVERAGE RATE (MBPS) | ACTIVE PERIOD (SECONDS) | AVERAGE ACTIVE RATE (MBPS) | MAXIMUM BURST LENGTH (MBITS) | OCCURRENCE TIME (SECONDS) |
|---|---|---|---|---|---|---|---|
| $C_1$ | $MI_1$ | $MT_1$ | $AR_1$ | $AP_1$ | $AAR_1$ | $MBL_1$ | $OT_1$ |
| $C_2$ | $MI_2$ | $MT_2$ | $AR_2$ | $AP_2$ | $AAR_2$ | $MBL_2$ | $OT_2$ |
| ... | ... | ... | ... | ... | ... | ... | ... |
| $C_N$ | $MI_N$ | $MT_N$ | $AR_N$ | $AP_N$ | $AAR_N$ | $MBL_N$ | $OT_N$ |

FIG. 6D

| CLIENT | COMMITTED RATE (MBPS) | OVERAGE LENGTH (MBITS) | DURATION (SECONDS) | OVERAGE RATE (MBPS) | MONETARY CHARGE |
|---|---|---|---|---|---|
| $C_1$ | $SLA\ CR_1$ | $MOL_1$ | $D_1$ | $MOR_1$ | $MC_1$ |
| $C_2$ | $SLA\ CR_2$ | $MOL_2$ | $D_2$ | $MOR_2$ | $MC_2$ |
| ... | ... | ... | ... | ... | ... |
| $C_N$ | $SLA\ CR_N$ | $MOL_N$ | $D_N$ | $MOR_N$ | $MC_N$ |

FIG. 7

SYSTEM AND METHOD FOR MONITORING AND ANALYZING NETWORK TRAFFIC

BACKGROUND INFORMATION

Modern communication networks are growing in size and complexity. As the number of consumers increases and services evolve in sophistication, the performance of these networks can degrade, in part, from link and pathway congestion. During information transport, link and pathway congestion customarily results in transmitted units of data (e.g., blocks, cells, frames, packets, etc.) becoming unevenly distributed over time, excessively queued, and discarded, thereby degrading the quality of network communications. Unfortunately, current techniques for analyzing network traffic are proving ineffective against bursty, transient patterns of traffic.

Therefore, there is a need for an approach that provides accurate, effective network traffic analysis.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A preferred apparatus, method, and software for monitoring and analyzing network traffic are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to packet-switched networks, it is contemplated that various exemplary embodiments are applicable to other transport environments, and technologies.

Figure 1:
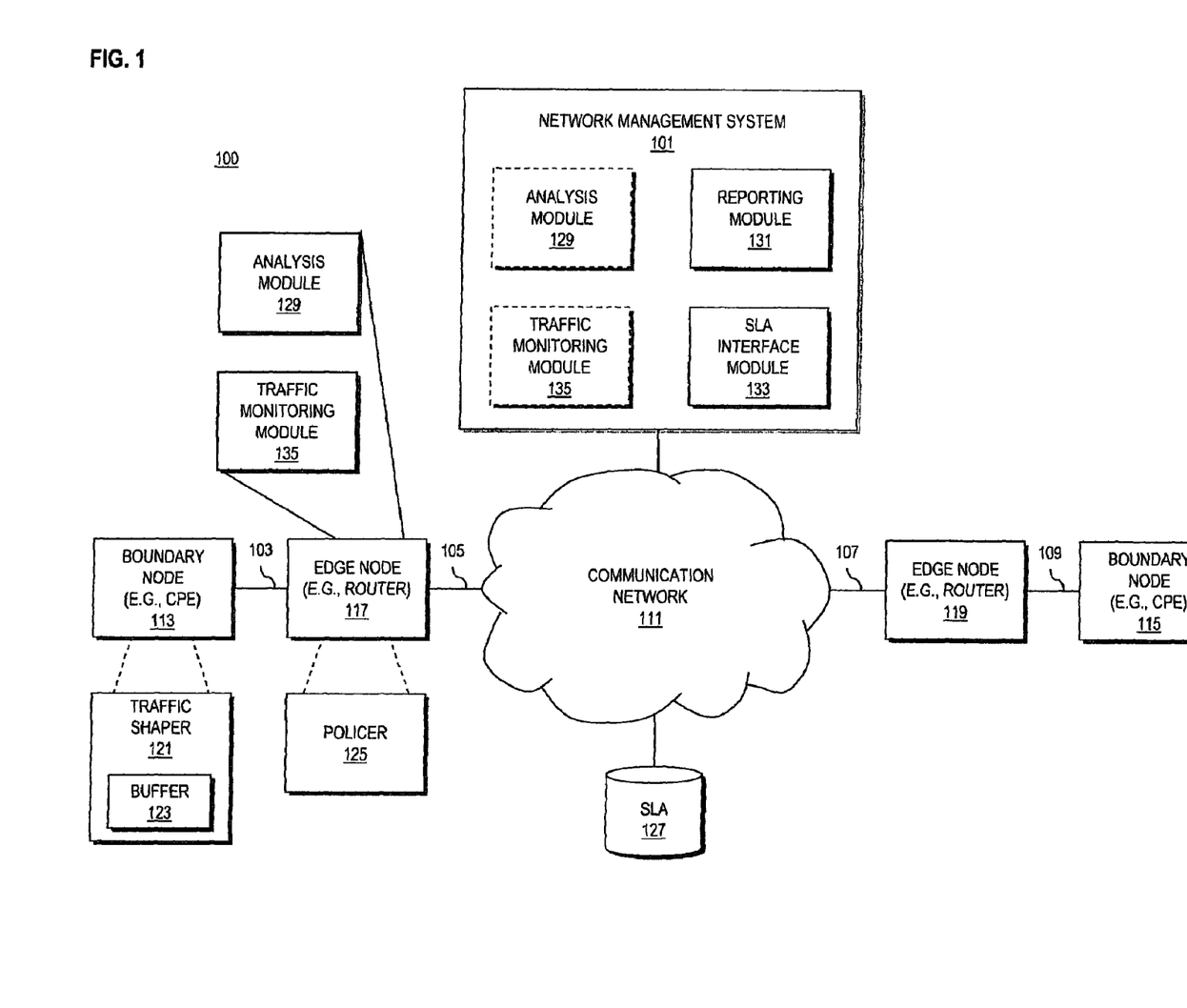
FIG. 1 is a diagram of system capable of monitoring and analyzing network traffic, according to an exemplary embodiment.

FIG. 1 is a diagram of system capable of monitoring and analyzing network traffic, according to an exemplary embodiment. For the purposes of illustration, a system 100 is described with respect to a network management system 101 configured to monitor and analyze network traffic related to one or more connections (e.g., links, pathways, etc.) 103-109, 105, 107, and 109 corresponding to one or more communication networks (or transport environments) 111. By way of example, communication network 111 may be a packet-switched (e.g., Internet Protocol (IP) based) network configured for the transport of information (e.g., data, voice, video, etc.) between one or more sources (e.g., boundary node 113) and one or more destinations (e.g., boundary node 115). While specific reference will be made thereto, it is contemplated that system 100 may embody many forms and include multiple and/or alternative components and facilities.

To assist with traffic engineering, service providers negotiate and apportion network capacity on general or subscriber-specific bases through service level agreements (SLA). These agreements define various communication service parameters in terms of bandwidth allocations. As such, network administrators require policing mechanisms to monitor and analyze network traffic on an ongoing basis, as well as ensure subscriber conformance with provisioned rates of service.

As previously mentioned, units of data (e.g., blocks, cells, frames, packets, etc.) transmitted across a transport environment are typically "policed" according to one or more committed rates of service, such as a committed burst bandwidth. These committed rates of service are generally associated with particular connection(s), e.g., links, pathways, etc., or other network parameters, e.g., incoming/outgoing interface, destination/source node, machine access control address, etc. When gathered into one or more service level agreements (SLA), committed rates of service offer transmitting entities (e.g., clients, equipment, providers, other networks, users, etc.) a framework by which to "ready" (or shape) traffic for transmission. It is noted that traffic shaping techniques are utilized by transmitting entities to delay metered traffic in order to bring transmissions into conformance with the constraints imposed by a carrier network. In turn, service providers police traffic, i.e., monitor proposed transmissions on an ongoing basis, to ensure that a transmitting entity is, in fact, conforming to their SLA committed rates of service. Typically, traffic policing occurs at the "edge" of a carrier network to limit the rate at which traffic enters or leaves the network. When a transmitting entity exceeds an SLA parameter, such as a committed burst length (or size), the carrier network is permitted to "drop" the excess units of data or, in some instances, "carry" them on a best effort (or lower quality of service) basis. However, if a committed rate of service is not sufficiently negotiated, policing mechanisms are too aggressively imposed, or shaping mechanisms are too leniently applied, network performance will be degraded. As such, traffic monitoring and analyzing is becoming an ever more critical component of effective traffic management.

Traditionally, service providers have monitored and analyzed network traffic through aggregation techniques that average this traffic over "large" time intervals. This causes the more "temporal," yet significant bursts of traffic to go undetected and, consequently, unmanaged. Therefore, the system 100 provides an approach, according to certain embodiments, that stems from the recognition that by reducing the coarse time granularity for monitoring and analyzing network traffic, service providers will be able to more effectively detect and manage bursts of network traffic.

As seen in FIG. 1, network management system 101 is configured to monitor, analyze, and report on network traffic originating from at least one source (e.g., boundary node 113) for transmission to at least one destination (e.g., boundary node 115) via one or more communication networks 111. Boundary nodes 113 and 115 access communication network 111 via one or more edge nodes (e.g., edge node 117 and 119, respectively) by way of connections 103, 105, 107, and 109. While not illustrated, data units (e.g., blocks, cells, frames, packets, etc.) transported over communication network 111 and, thereby, between edge nodes 117 and 119, may traverse one or more other connections and/or nodes of communication network 111.

In this manner, boundary nodes 113 and 115 represent suitable customer premise equipment (CPE). That is, boundary nodes 113 and 115 may be routers, servers, switches, terminals, workstations, etc., of a client (or subscriber). It is contemplated that boundary nodes 113 and 115 may communicate multiple flows of traffic originating from one or more users (not shown) of, for example, an enterprise (or otherwise private) network of a client. Similarly, edge nodes 117 and 119 may represent suitable routers, servers, switches, terminals, workstations, etc., of a service provider of, for example, communication network 111. In exemplary embodiments, communication network 111 may correspond to suitable wired and/or wireless networks providing, for instance, a local area network (LAN), metropolitan area network (MAN), wide area network (WAN), or combination thereof. Communication network 111 may correspond to a backbone network of a service provider. As such, communication network 111 may operate as an asynchronous transfer mode (ATM) network, frame relay network, integrated services digital network (ISDN), internet protocol (IP) network, multiprotocol label switching (MPLS) network, or synchronous optical networking (SONET) network, as well as any other suitable network, or combination thereof.

According to various embodiments, boundary nodes 113 and 115 include traffic shapers (e.g., shaper 121) configured to delay metered traffic according to one or more deterministic constraints (or rates of service), such as a maximum burst length (or size), maximum burst rate, sustainable burst length, sustainable burst rate, etc. It is noted that these traffic variables may be defined in terms of, for example, bandwidth allocations. Traffic shaping functions may be implemented by shaper 121 through one or more buffers (e.g., buffer 123) that temporarily "hold" and/or "schedule" units of data for transmission so that traffic shaper 121 can disperse traffic as bandwidth becomes available on an outgoing connection, such as connection 103. Shaper 121 can be configured so that transmitted units of data (e.g., one or more blocks, cells, frames, packets, etc.) are not dropped or marked by a policer (e.g., policer 125) of, for example, an edge node (e.g., edge node 117) that is configured to selectively permit access to a transport environment, such as communication network 111.

Policer 125 limits access to communication network 111 based on one or more committed rates of service stored to, for example, a service level agreement (SLA) repository 127. It is noted that the committed rates of service may also be stored to a local memory of (or accessible by) policer 125. As such, policers, e.g., policer 125, enable network connections (e.g., connections 103-109) to be maintained within corresponding envelops of performance, e.g., within the bounds of one or more committed rates of service. Thus, in order to prevent transmitted units of data from being discarded or marked, it is imperative that the committed rates of service of a client are sufficiently negotiated, that policing mechanisms are not too aggressively imposed, and that shaping mechanisms are not too leniently applied. If, however, one or more of these variables (or attributes) are not properly apportioned, network performance will be degraded.

Accordingly, network administrators via network management system 101 can determine which one or more of the traffic variables require attention or modification.

By way of example, network management system 101 may comprise computing hardware (such as described with respect to FIG. 7) configured to execute the processes described herein. In one implementation, network management system 101 includes analysis module 129, reporting module 131, SLA interface module 133, and traffic monitoring module 135. It is contemplated, however, that network management system 101 may embody many forms and include multiple and/or alternative components or configurations. For example, it is contemplated that one or more components of network management system 101 may be combined, located in separate structures, or separate physical locations. In other words, a specific topology is not critical to embodiments of network management system 101 or system 100 for that matter. Moreover, the analysis module 129 and traffic monitoring module 135 can reside in the edge nodes (e.g., node 117); this arrangement can enhance scalability.

In exemplary embodiments, traffic monitoring module 135 monitors network traffic associated with one or more connections (e.g., connections 103-109) of system 100. Monitoring may be performed over any suitable time interval, which may be predefined and/or configured by, for example, a network administrator. For instance, a configurable time interval may be established for monitoring network traffic over several seconds, minutes, hours, days, etc. Further, the configurable time interval may be subdivided into a plurality of configurable subintervals. That is, the network administrator may provision a time granularity for the configurable time interval that can enable analysis module 129 to analyze network traffic behaviors at various temporal "grains" of the configurable time interval. In certain exemplary embodiments, time granulations may be on the order of one or more seconds, deciseconds, centiseconds, milliseconds, microseconds, nanoseconds, etc. As the configurable time interval becomes more granular, traffic abstraction and aggregation can be reduced so that analysis module 129 can detect and analyze the more "temporal," yet significant bursts of traffic.

According to particular embodiments, traffic monitoring module 135 may alternatively (or additionally) receive input provided from one or more traffic sniffers (not illustrated) provisioned before ingress to (or after egress of) one or more of the network nodes of system 100, such as before ingress to boundary node 113, before ingress to edge node 117, and after egress of edge node 117. In this manner, the network traffic of a client may be monitored before and after traffic shaping, as well as before and after traffic policing. It is also contemplated that traffic monitoring module 135 (or the traffic sniffers) can be configured to receive input from a mirroring port of a network node (e.g., node 113, 115, 117, or 119). A mirroring port enables transmitted units of data received by the node to be mirrored (or copied) to a memory of traffic monitoring module 135, a traffic sniffer, network management system 101, or any other suitable memory or repository of system 100. As such, traffic monitoring module 135 and/or the traffic sniffers may intercept, mirror, and/or log various forms of traffic information. This information may correlate to one or more flows of traffic that a client has submitted for provisioning over communication network 111, one or more flows of traffic that have been shaped by, for example, a boundary node (e.g., boundary node 113) to communication network 111, or one or more flows of traffic that have been policed by, for instance, an edge node (e.g., edge node 117) of communication network 111.

In general, a transmitted unit of data is received at a network node (e.g., boundary node 113) in a particular format including a "header" and a "payload." Headers typically provide supplemental information concerning information to be transported, while payloads carry the "random" information submitted for transportation. According to certain embodiments, the information generated (or obtained) by traffic monitoring module 135 can be information extracted from the headers of the transmitted units of data. This header information may include information, such as a source of the unit of data (e.g., boundary node 113), a destination for the unit of data (e.g., boundary node 115), a preferred transport route (e.g., from boundary node 113 to edge node 117, from edge node 117 to edge node 119, from edge node 119 to boundary node 115), and, in certain instances, a priority (or class of service) for transport. Other types of information, such as a length (or size) and a timestamp, may also be provided; it is noted that this information is metadata about the packet, and need not be specified in the packet headers themselves. As such, the header information may be parsed (or copied) from the headers of the actual (or mirrored) network traffic and may be stored using a suitable structuring technique, such as a relational table, hierarchical tree, networked model, etc. Network traffic information may be stored to one or more suitable repositories or memories of system 100, such as a shared network traffic repository, a memory of network management system 101, etc. Exemplary network traffic information is described in more detail in accordance with FIG. 4.

According to one embodiment, traffic monitoring module 135 ports network traffic information to analysis module 129 for traffic analysis, which may be performed in real-time (i.e., as the information is generated or collected), on a periodic basis (e.g., after a predetermined time period, such as at the conclusion of one or more subintervals, or the conclusion of the configurable time interval), or in an "on-demand" fashion (i.e., when requested by a network administrator). Additionally or alternatively, network traffic information is provided to analysis module 129 and, subsequently, analyzed upon detection of one or more traffic events, such as an excessively burdened buffer, an overly active policer, or other suitable traffic event, e.g., upon detecting a certain level or rate of traffic. In this manner, analysis module 129 utilizes rule-based logic to measure a traffic rate or determine various traffic statistics associated with a source (e.g., boundary node 113), such as an average active rate of transmission, an average rate of transmission, a maximum burst duration, a maximum burst length, a maximum burst rate, or any other suitable parameter. Analysis module 129 may also acquire one or more committed rates of service from SLA interface module 133 that, in turn, interfaces with SLA repository 127. As such, analysis module 129 may be configured to compare a received committed rate of service with one or more of the measured rates or traffic statistics in order to determine a committed rate of service overage, a maximum excess byte count, etc. This enables network management system 101 to determine whether a client is conforming to their SLA.

The measured traffic rates or statistics generated by analysis module 129 may be provided to reporting module 131 for generating one or more bursty traffic reports. According to certain embodiments, the bursty network traffic reports are made available to network administrators and/or pertinent clients. For example, a bursty traffic report may be generated by reporting module 131 and provided to a client in the form of an electronic mailing, facsimile transmission, or postal mailing. In other embodiments, a bursty traffic report is accessible via a networked application (e.g., website). For instance, a bursty traffic report may be "viewed" or "downloaded" by a client via an online graphical user interface (GUI) hosted by, for example, network management system 101. That is, network management system 101 may also include a user interface module (not shown) configured to provide network access to the bursty traffic reports and/or configurable variables of analysis module 129 or traffic monitoring module 135. As such, network management system 101 can provide clients and network administrators with a common set of networked applications for monitoring, analyzing, and reporting on the network traffic of one or more clients, as well as providing access to generated bursty traffic reports. While not illustrated, network management system 101 may also interface, either directly or via one or more networks (e.g., communication network 111), with a billing system in order to generate client invoices. Invoice generation may be based on one or more of the measured traffic rates, traffic statistics, SLA conformance determinations, or other suitable datum.

Figure 2:
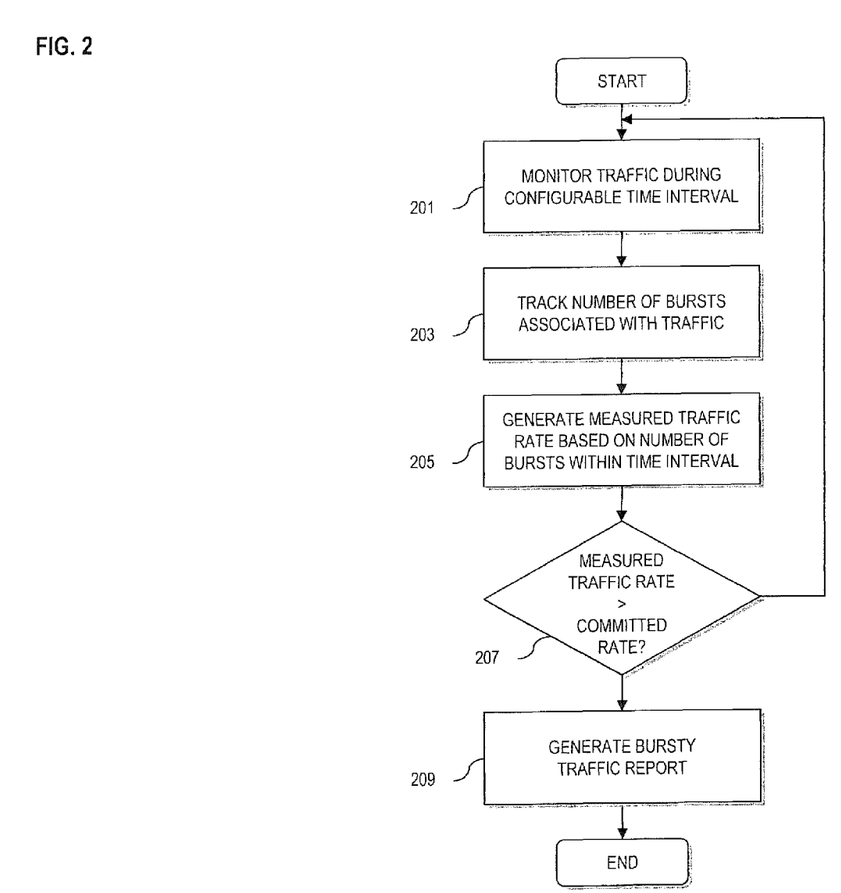
FIG. 2 is a flowchart of process for monitoring and analyzing network traffic, according to an exemplary embodiment.

FIG. 2 is a flowchart of process for monitoring and analyzing network traffic, according to an exemplary embodiment. For illustrative purposes, process is described with reference to FIG. 1. While process assumes real-time monitoring and analyzing of network traffic, it is contemplated that process is applicable to monitoring and analyzing traffic on a periodic basis or in an "on-demand" fashion. Further, it is noted that the steps of process may be performed in any suitable order or combined in any suitable manner.

Figure 4:
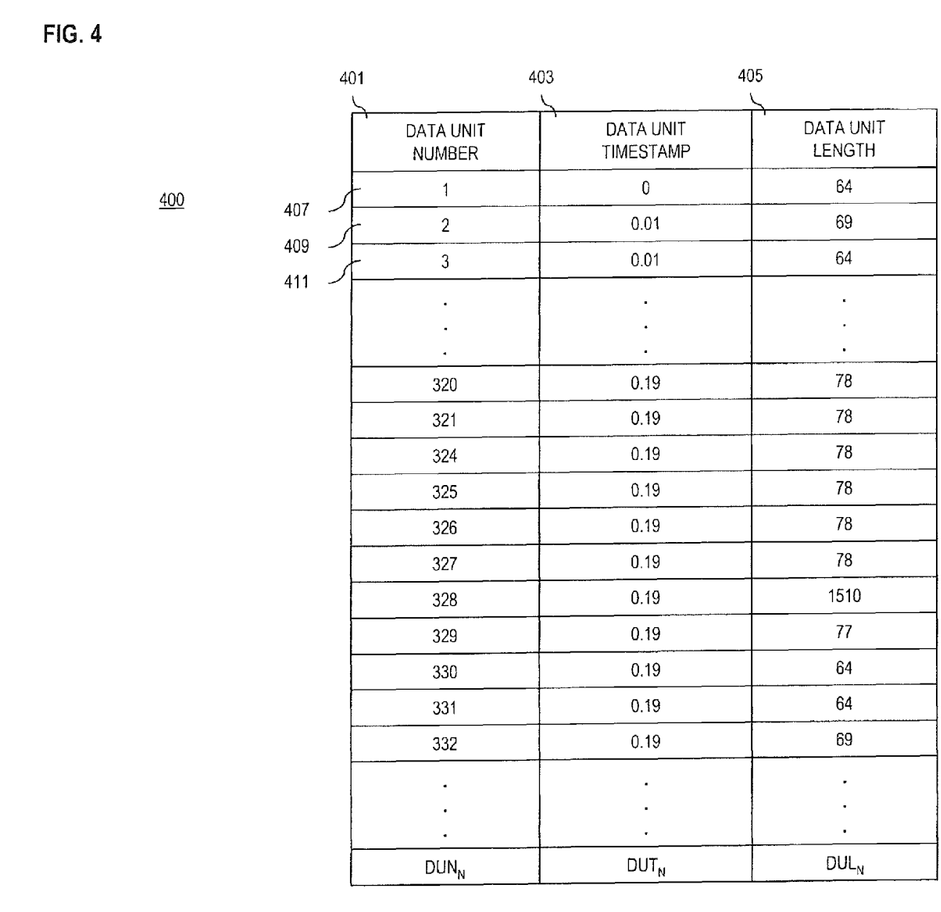
FIG. 4 is a diagram of network traffic information utilized in the processes of FIGS. 3A and 3B, according to an exemplary embodiment.

In step 201, network management system 101 monitors traffic during a configurable time interval, such as for several minutes, at a time granularity on the order of, for example, a millisecond or microsecond. During this period, traffic monitoring module 135 generates (or receives) network traffic information, such as illustrated in FIG. 4, concerning at least one flow of network traffic corresponding to, for example, a client device, e.g., boundary node 113. In exemplary embodiments, the network traffic information includes length and timestamp information and is extracted from the corresponding headers of the various transmitted units of data embodying the flow of network traffic. Per step 203, analysis module 129 tracks a number of bursts associated with the traffic. That is, analysis module 129 defines one or more bursts of network traffic based on the length and timing information, as well as counts (or determines) various lengths of the traffic, e.g., a total length of the monitored network traffic, lengths of individual bursts, etc.

According to one embodiment, a burst of network traffic may be defined as an amount of network traffic stored to a buffer (e.g., buffer 123) of a shaper (e.g., shaper 121) of a node (e.g., boundary node 113) at the end of a given time period. As such, a burst of network traffic can be determined based on an amount of network traffic received by the network node during the time period, an amount of network traffic previously stored within the buffer 123, and an amount of network traffic that can be released from the buffer 123 by the shaper 121 during the time period. Thus, a burst of network traffic "$Burst\_T_i$" associated with a node "X" and, thereby, stored to a buffer "Y" of shaper "Z" at the conclusion of a time period "$T_i$" may be defined in Equation (1) as follows:

$$\text{Burst\_T}_i = \text{Burst\_T}_{i-1} + \text{Received\_T}_i - \text{Provisioned\_T}_i \text{ where:} \quad (1)$$

$\text{Burst\_T}_i = $ Amount of network traffic stored to buffer "$Y$" at the end of time period "$T_i$"

$\text{Burst\_T}_{i-1} = $ Amount of network traffic stored to buffer "$Y$" at the beginning of time period "$T_i$"

$\text{Received\_T}_i = $ Amount of network traffic received by node "$X$" during time period "$T_i$"

$\text{Provisioned\_T}_i = $ Amount of network traffic provisioned from node "$X$" by shaper "$Z$" during time period "$T_i$"

$T_i = $ Time period of a subinterval of the configurable time interval "$T$" for monitoring the network traffic $T = $ Configurable time period In this manner, Equation (1) produces a positive burst length when buffer "X" is being filled with network traffic by shaper "Z" and yields a zero or negative burst length when buffer "X" is fully depleted. Therefore, Equation (1) may be adapted to Equation (2) to account for negative burst values.

$$\text{Burst\_T}_i = \begin{cases} \text{Burst\_Ti}, & \text{if Burst\_Ti} \geq 0 \\ 0, & \text{if Burst\_Ti} < 0 \end{cases} \quad \text{Eq. (2)}$$

Analysis module 129 may generate a measured traffic rate based on the number of bursts occurring within the configurable time interval, per step 205. Namely, by dividing a particular burst of network traffic by the time period over which it is realized, a burst rate may be defined in Equation (3) as follows:

$$\text{Burst\_Rate\_T}_i = \frac{\text{Burst\_T}_i}{T_i} \quad \text{Eq. (3)}$$

where $\text{Burst\_Rate\_T}_i = $ Burst rate over subinterval time period $T_i$ Accordingly, each subinterval time period "$T_i$" of a configurable time interval "T" may be tracked, i.e., analyzed for at least a burst length "Burst\_$T_i$" and a burst rate "Burst\_Rate\_$T_i$" of network traffic. Thus, an array of burst lengths and burst rates may be defined and generated. From these arrays, an average, maximum, mean, minimum, etc., burst length and/or burst rate may be determined. According to particular embodiments, the burst rates may be mapped to corresponding frequencies of occurrence so that other measured traffic rates may be determined. For instance, the frequencies of occurrence corresponding to burst lengths or burst rates greater than zero can be utilized to determine an active time period over which buffer "X" experiences bursts of network. An active time period may be defined in Equation (4) as follows:

$$\text{Active\_Period} = \frac{\sum \text{P\_Fs}}{\sum \text{All\_Fs}} * T \quad \text{Eq. (4)}$$

where $\text{Active\_Period} = $ Time period over which buffer "$X$" experiences burst of network traffic $\sum \text{P\_Fs} = $ Sum of all those frequencies corresponding to a burst length or burst rate greater than zero $\sum \text{All\_Fs} = $ Total number of observations $T = $ Configurable time interval By counting a total length of the network traffic monitored, an average rate of transmission and an average active rate of transmission rate may be determined based on Equations (5) and (6), respectively.

$$\text{A\_RT} = \frac{TL}{T} \quad \text{Eq. (5)}$$

$$\text{AA\_RT} \frac{TL}{\text{Active\_Period}} \quad \text{Eq. (6)}$$

where

A\_RT = Average rate of transmission

AA\_RT = Average active rate of transmission $TL = $ Total length of network traffic monitored during configurable time period $T$ $T = $ Configurable time interval By comparing one or more of these measured rates (e.g., maximum burst rate, average rate of transmission, average active rate of transmission, etc.) to a committed rate of service, analysis module 129 may determine whether the network traffic of a client conforms to the committed rates of service of the client. Thus, during step 207, analysis module 129 determines whether a measured traffic rate is greater than a committed rate received from, for example, SLA repository 127 by, for instance, SLA interface module 133. If the measured traffic rate is greater than the committed rate of service, then analysis module 129 provides one or more of the traffic statistics, measured traffic rates, or committed rate of service overages to reporting module 131 to generate a bursty traffic report, per step 209. If the measured traffic rate is less than or equal to the committed rate of service, then process reverts back to step 201, i.e., traffic monitoring module 135 continues to monitor traffic during the configurable time interval.

Figure 3A:
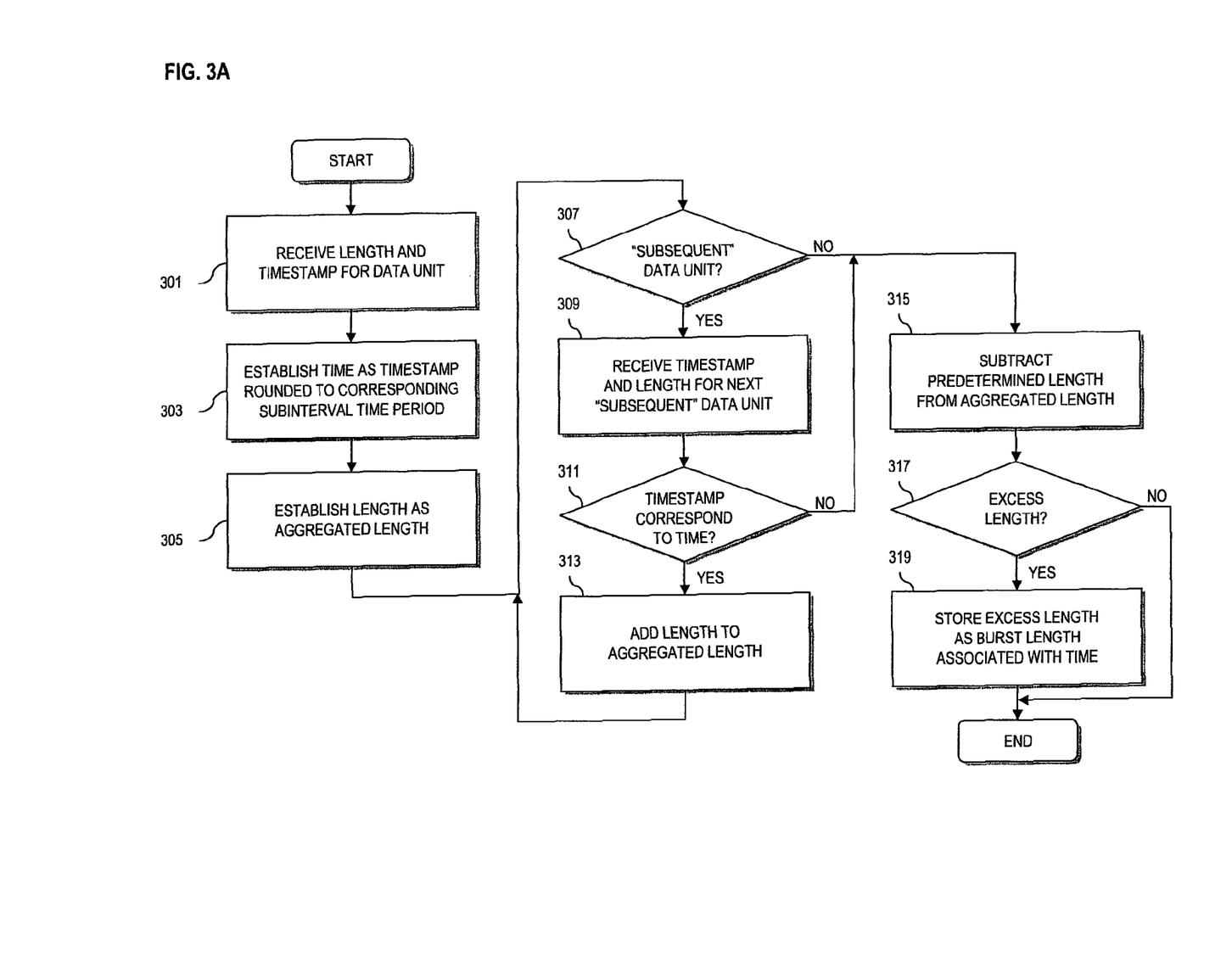
FIGS. 3A and 3B are flowcharts of processes for determining statistics for network traffic, according to various exemplary embodiments.
Figure 3B:
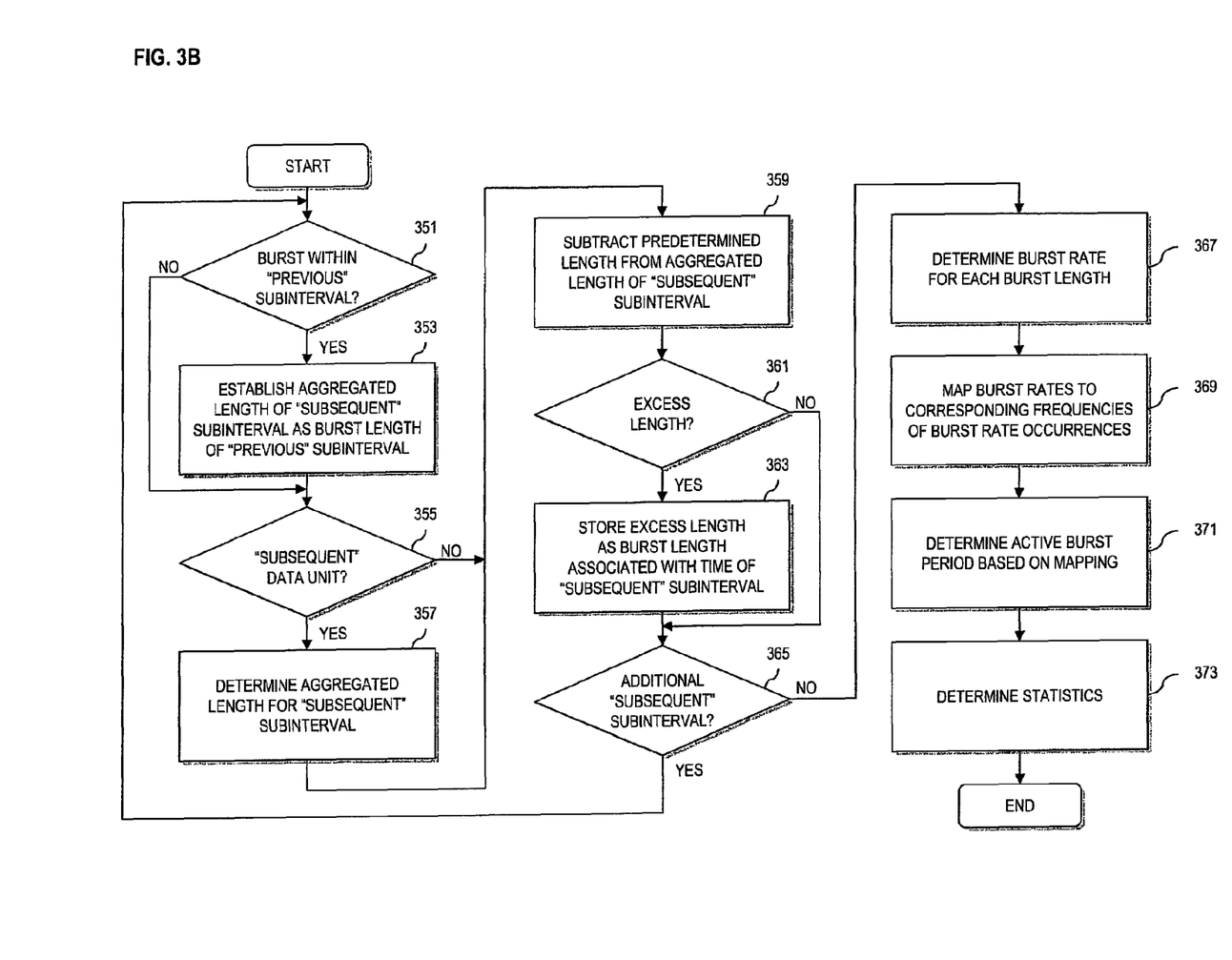

FIGS. 3A and 3B are flowcharts of processes for determining statistics for network traffic, according to various exemplary embodiments. FIG. 4 is an exemplary diagram of network traffic information utilized in the processes of FIGS. 3A and 3B. In particular, FIG. 3A is a flowchart of an exemplary process for analyzing a subinterval of network traffic and determining statistics for that subinterval of network traffic. For illustrative purposes, process is described with respect to FIG. 1. It is noted that the steps of process may be performed in any suitable order or combined in any suitable manner.

At step 301, network management system 101 (i.e., analysis module 129) receives timestamp and length information for a monitored unit of data corresponding to, for example, a unit of data received by boundary node 113 for transport to boundary node 115 via communication network 111. In exemplary embodiments, traffic monitoring module 135 provides analysis module 129 with network traffic information, such as the network traffic information shown in FIG. 4. According to one embodiment, the network traffic information is provided as a relational table 400 or other suitable data structure conveying network traffic information, such as a hierarchical data structure, a networked data structure, etc. As seen in FIG. 4, table 400 includes various fields for populating attributes corresponding to a flow of network traffic, i.e., corresponding to one or more units of data embodying the flow. The attributes may include data unit number 401, data unit timestamp 403, and data unit length 405. A particular data unit number will correspond to a respective, non-dimensional ordering (e.g., from data unit "1" to data unit "$DUN_N$") in which a particular unit of data was monitored by, for example, traffic monitoring module 135. Meanwhile, a particular data unit timestamp will correspond to a respective, dimensional time ordering (e.g., from time "0" to time "$DUT_N$") in which a particular data unit was monitored by, for instance, traffic monitoring module 135. In this manner, the amount of time from time "0" to time "$DUT_N$" will correspond to the configurable time interval over which a flow of network traffic is monitored. Further, individual timestamps will reside within a particular subinterval of the configurable time interval. According to exemplary embodiments, the period of a subinterval can be predefined in terms of seconds, milliseconds, nanoseconds, etc., such that one or more units of data can be monitored during the subinterval period. For example, units of data 409 and 411 are monitored within a same subinterval, e.g., the subinterval period beginning at timestamp "0.01" and ending at (or just before) timestamp "0.02." A particular data unit length will correspond to a length (or size) of a particular unit of data, e.g., a certain number of bytes. This information may be generated by traffic monitoring module 135 and/or one or more of the aforementioned packet sniffers, or may be "read" or "parsed" from, for instance, respective "headers" of the units of data.

Referring back to FIG. 3A, analysis module 129 may, in step 301, receive from traffic monitoring module 135 (or may "read" from table 400 itself) length and timestamp for a unit of data 407, i.e., length of "64" and timestamp of "0." Accordingly, analysis module 129 establishes, per step 303, a subinterval time as the timestamp of the unit of data rounded to a corresponding subinterval time period, e.g., the subinterval time is set to the beginning of the very "next" subinterval of the configurable time interval. In the case of timestamp "0," time will be set to 0.01, assuming 0.01 corresponds to the subinterval time period. At step 305, analysis module 129 establishes an aggregated length for the subinterval. That is, the length of the unit of data (e.g., length of "64") is set as the aggregated length.

Once time and aggregated length are established, analysis module 129 determines (in step 307) whether any "subsequent" units of data were monitored by, for instance, traffic monitoring module 135. If there is at least one "subsequent" unit of data, then analysis module 129 receives timestamp and length for the next "subsequent" unit of data, per step 309. It is noted that the timestamp and length may be alternatively "read" from table 400 by analysis module 129. Based on the network traffic information of FIG. 4, the next "subsequent" unit of data corresponds to data unit 409 having timestamp of "0.01" and length of "69." Accordingly, analysis module 129 determines, per step 311, whether the timestamp of the "subsequent" unit of data unit (e.g., data unit 409) corresponds to the subinterval time established during step 303. In exemplary embodiments, when the timestamp is less than the subinterval time, the timestamp will correspond to the subinterval time. For example, since the timestamp of data unit 409 is equal to the subinterval time established during step 303, the timestamp of data unit 409 does not correspond to the subinterval time. If, however, the timestamp does correspond to the subinterval time, then analysis module 129 (per step 313) adds the length of the subsequent unit of data unit the established aggregated length to generate a "new" aggregated length. For instance, analysis module 129 would aggregate the lengths of data units 409 and 411 when the subinterval corresponding to data units 409 and 411 is analyzed. If, however, there are no "subsequent" units of data or the timestamp of the next "subsequent" unit of data does not correspond to the subinterval time, then process proceeds to step 315. It is noted that if the timestamp of the next "subsequent" unit of data does not correspond to the subinterval time, analysis module 129 can note this occurrence for analyzing a "subsequent" subinterval, as will become more apparent in FIG. 3B.

At step 315, analysis module 129 subtracts a predetermined length from the aggregated length of the subinterval time period being analyzed. It is noted that the predetermined length may correspond to a length (e.g., amount of bytes) that can be provisioned to a connection (e.g., connection 103) during the corresponding subinterval time period being analyzed. That is, the predetermined length is an amount of network traffic that can be released from, for example, buffer 123 by shaper 121 during the subinterval time period. At step 317, analysis module 129 determines whether any excess length results from step 315, i.e., whether the result of step 315 is greater than zero. If excess length does result, than, per step 319, the excess length is stored as a burst length that, in exemplary embodiments, can be stored associated with the time of the subinterval being analyzed, i.e., an array of burst lengths can be generated. It is noted that the array of burst lengths can include zero values for those subintervals where no network traffic burst is realized, i.e., when no excess length is determined. Further, it is noted that if excess length does result, analysis module 129 can also note this occurrence for analyzing a very "next" subinterval, as will become more apparent in FIG. 3B. In exemplary embodiments, the burst lengths and/or the "notes" may be stored to a memory (not shown) of network management system 101 or any other suitable repository of system 100. If excess length does not result, then process ends.

In those instances when the timestamp in step 311 does not correspond to the time established in step 303, or excess length results from step 315, a "subsequent" subinterval is analyzed. It is noted that the "subsequent" subinterval may correspond to a very "next" subinterval in the configurable time interval (such as in the case when excess length results from step 315) or may correspond to a "later," not necessarily the very "next" subinterval, in the configurable time interval (such as in a case when the timestamp in step 311 does not correspond to the time established in step 303, and the timestamp is not within the very "next" subinterval time period). FIG. 3B is a flowchart of a process for analyzing subsequent subintervals and determining statistics for network traffic, according to an exemplary embodiment. For illustrative purposes, process is described with respect to FIGS. 1 and 3A. It is noted that the steps of process may be performed in any suitable order or combined in any suitable manner.

In step 351, network management system 101 (i.e., analysis module 129) determines whether a burst occurred within a very "previous" subinterval, i.e., whether a burst length was stored for the preceding subinterval of the configurable time interval, such as excess length being stored, per step 357. If excess length was stored, then the stored burst length of the "previous" subinterval is established as the aggregated length of the "subsequent" subinterval, per step 353. While not shown, the time of the "subsequent" subinterval will be established as the previous time plus a subinterval time period that, in exemplary embodiments, corresponds to the time granularity of the configurable time interval. If no excess length was stored, then process proceeds to step 355.

At step 355, analysis module 129 determines whether any "subsequent" units of data were monitored by, for instance, traffic monitoring module 135 during the configurable time interval. If there was at least one "subsequent" unit of data, then analysis module 129 determines an aggregated length for the "subsequent" subinterval time interval. If there was a burst during the "previous" time interval (as determined during step 351), the determination of step 357 resembles that of steps 309-313 of FIG. 3A, wherein the aggregated length of step 355 can be augmented during step 313. If there was no burst during the "previous" time interval (as determined during step 351), the determination of step 357 is the same as step 301 through step 313 of FIG. 3A for the "subsequent" unit of data. Further, it is noted that during step 357 (namely, step 311 of the process performed during step 357) analysis module 129 can note whether an additional "subsequent" subinterval is to be analyzed, i.e., when the timestamp of another "subsequent" unit of data does not correspond to the "current" "subsequent" subinterval. If there are no "subsequent" units of data, process proceeds to step 359.

At step 359, analysis module 129 subtracts a predetermined length from the aggregated length of the "subsequent" subinterval. It is noted that the predetermined length corresponds to a length that can be provisioned to a connection (e.g., connection 103) during the corresponding subinterval being analyzed. That is, the predetermined length is an amount of traffic network that can be released from buffer 123 by shaper 121 during a unit time period, i.e., a unit time period corresponding to the configurable time interval granularity (e.g., one or more seconds, milliseconds, nanoseconds, etc.).

Accordingly, at step 361, analysis module 129 determines whether there is any excess length—i.e., whether the result of step 359 is greater than zero. If there is excess length, per step 363, then the excess length is stored as a burst length that, in exemplary embodiments, can be stored associated with the time of the "subsequent" subinterval being analyzed. That is, an array of burst lengths can be generated. It is noted that the array of burst lengths can include zero values for those subintervals where no network traffic burst is realized, i.e., when no excess length is determined for those subintervals. Further, it is noted that if excess length does result, analysis module 129 can note this occurrence for analyzing a very "next, subsequent" subinterval.

In step 365, analysis module 129 determines whether an additional subinterval is to be analyzed. Namely, analysis module 129 determines whether another "subsequent" subinterval is to be analyzed either because the timestamp in step 311 did not correspond to the "subsequent" subinterval time, or excess length resulted in step 359. If an additional "subsequent" subinterval is to be analyzed, then the process performs the prior steps 351-355 for this subsequent subinterval. If no additional "subsequent" subinterval is to be analyzed, then process proceeds to step 367.

Otherwise, analysis module 129 determines, as in step 367, a burst rate for each determined burst length, e.g., each burst length stored to, for example, the aforementioned burst length array. In particular, analysis module 129 divides each burst length by a predetermined amount of time that, in exemplary embodiments, corresponds to the configurable time interval granularity (i.e., the amount of time corresponding to a subinterval). If, however, the subinterval time periods of the configurable time interval are variable, then analysis module 129 will utilize the subinterval time period corresponding to a particular burst length to determine the various burst rates. During step 369, analysis module 129 maps the burst rates to corresponding frequencies of occurrence. For those subintervals not exhibiting a burst length, a zero burst rate will be populated and, accordingly, mapped. An exemplary mapping is provided in FIGS. 6A and 6B. Based on mapping, analysis module 129 can determine an active burst period, per step 371, such as previously described. Accordingly, in step 373, analysis module may determine one or more of the aforementioned statistics or measured traffic rates relating to the network traffic of a client.

Figure 5:
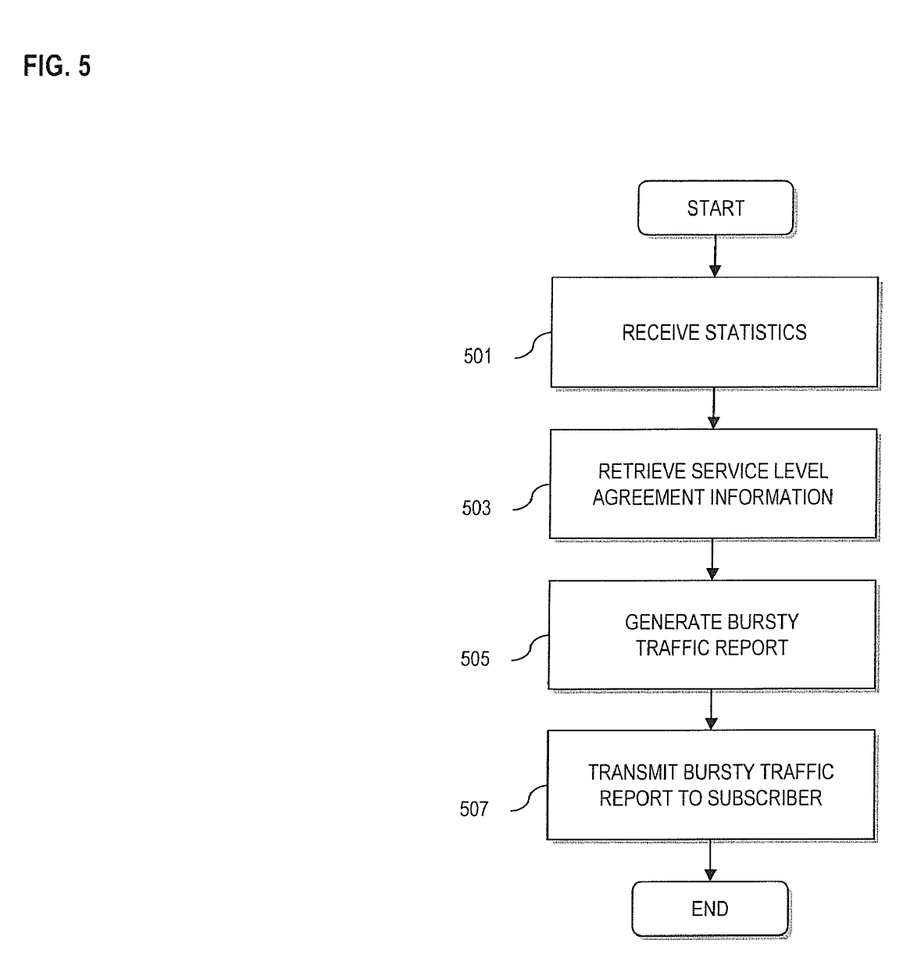
FIG. 5 is a flowchart of a process for generating network traffic reports, according to an exemplary embodiment.

FIG. 5 is a flowchart of a process for generating network traffic reports, according to an exemplary embodiment. For illustrative purposes, process is described with reference to FIG. 1. In step 501, reporting module 131 receives, from analysis module 129, statistics for filtered bursts associated with a transmission source of a client, e.g., boundary node 113. Per step 503, reporting module 131 retrieves, via SLA interface module 133, SLA information corresponding to the client from SLA repository 127. Based on the statistics and the SLA information, reporting module 131 generates, during step 505, one or more bursty traffic reports, such as those exemplary bursty traffic reports illustrated in FIGS. 6A-6D. At step 507, the generated bursty traffic reports are transmitted to the client via, for example, a communication interface (not shown) of network management system 101. According to various embodiments, the bursty traffic reports may be provided to the subscriber by electronic mail, facsimile, or postal mail. In other instances, the bursty traffic reports may be made accessible to the subscriber via a networked application (e.g., website). As such, the bursty traffic reports may be "viewed" or "downloaded" by subscribers via a online graphical user interface (GUI) hosted by, for example, network management system 101.

Figure 6A:
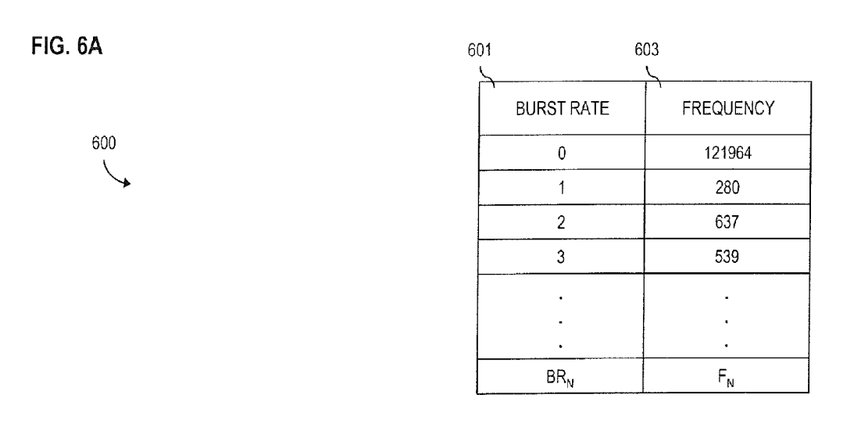
FIGS. 6A-6D are diagrams of network traffic reports created in the process of FIG. 5, according to various exemplary embodiments.
Figure 6B:
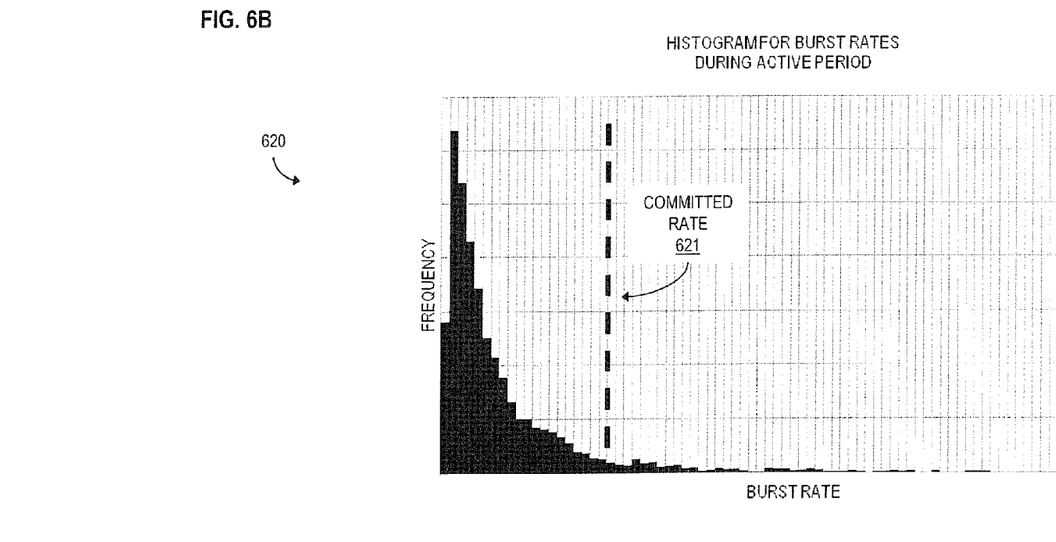

FIGS. 6A-6D are diagrams of network traffic reports created in the process of FIG. 5, according to various exemplary embodiments. In particular, FIG. 6A is a diagram of an exemplary bursty traffic report 600 illustrating a mapping of burst rates 601 to corresponding frequencies of occurrence 603. FIG. 6B is a diagram of an exemplary graph 620 of the mapping of FIG. 6A. Graph 620 may include one or more committed rate indicators 621 for visualizing an amount of traffic either conforming to or exceeding the committed rate of service indicator 621.

Figure 6C:
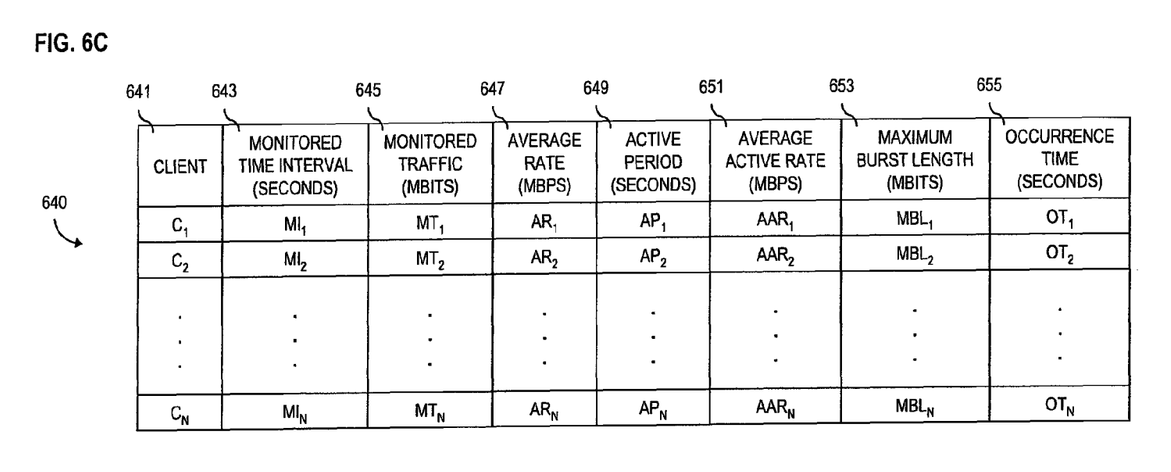
Figure 6D:
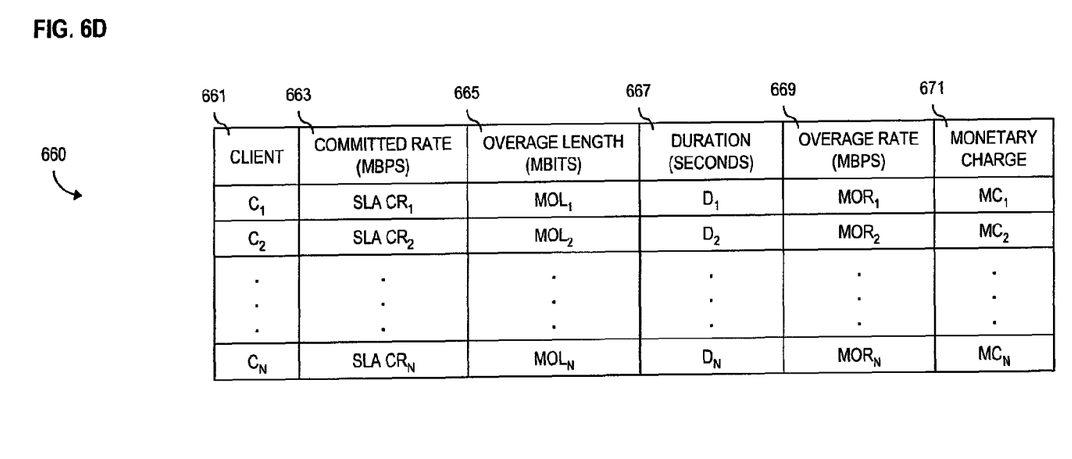

FIGS. 6C and 6D are diagrams of exemplary bursty traffic reports providing various statistics in relational tables 640 and 660, respectively. Tables 640 and 660 include various statistics, measured traffic rates, and/or committed rate of service overage information. The statistics, measured traffic rates, and overage information can be associated with one or more clients. In this manner, table 640 includes corresponding fields for populating attributes, such as clients 641, monitored time interval 643 (i.e., the configurable time interval), monitored traffic 645 (i.e., a total length of the network traffic monitored), average rate of transmission 647, an active period 649, an average active rate of transmission 651, a maximum burst length 653, and an occurrence time for the maximum burst length 655. Table 660 includes fields for populating attributes, such as clients 661, a provisioned rate of service 663, an overage length 665 (e.g., an amount of network traffic exceeding a committed amount), duration 667 (e.g., a period of time over which a client exceeding a committed rate of service), an overage rate 669, and a monetary charge 671 for the overage(s).

The processes described herein for monitoring and analyzing network traffic may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 7:
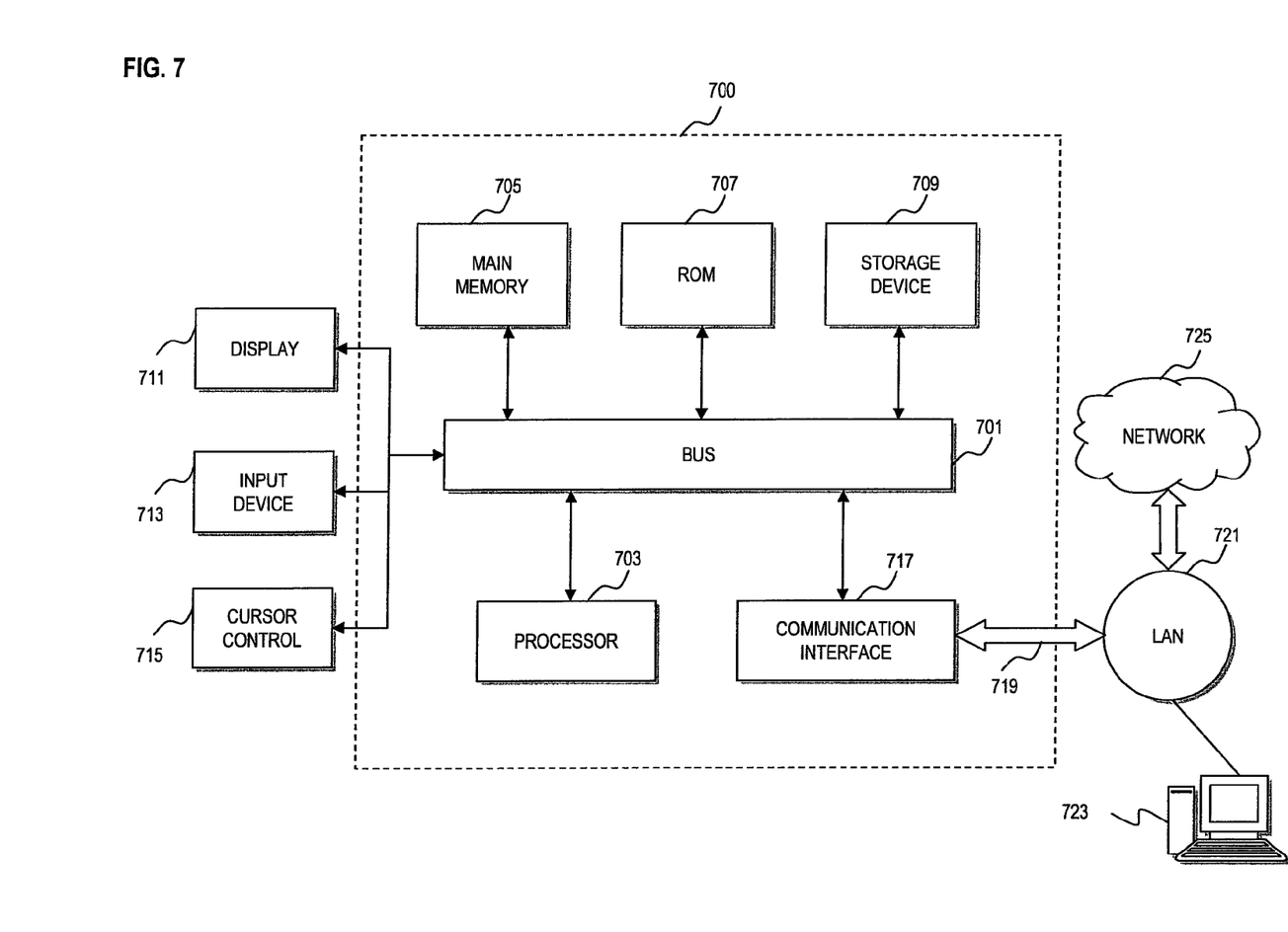
FIG. 7 is a diagram of a computer system that can be used to implement various exemplary embodiments

FIG. 7 illustrates computing hardware (e.g., computer system) 700 upon which an embodiment according to the invention can be implemented. The computer system 700 includes a bus 701 or other communication mechanism for communicating information and a processor 703 coupled to the bus 701 for processing information. The computer system 700 also includes main memory 705, such as a random access memory (RAM) or other dynamic storage device, coupled to the bus 701 for storing information and instructions to be executed by the processor 703. Main memory 705 can also be used for storing temporary variables or other intermediate information during execution of instructions by the processor 703. The computer system 700 may further include a read only memory (ROM) 707 or other static storage device coupled to the bus 701 for storing static information and instructions for the processor 703. A storage device 709, such as a magnetic disk or optical disk, is coupled to the bus 701 for persistently storing information and instructions.

The computer system 700 may be coupled via the bus 701 to a display 711, such as a cathode ray tube (CRT), liquid crystal display, active matrix display, or plasma display, for displaying information to a computer user. An input device 713, such as a keyboard including alphanumeric and other keys, is coupled to the bus 701 for communicating information and command selections to the processor 703. Another type of user input device is a cursor control 715, such as a mouse, a trackball, or cursor direction keys, for communicating direction information and command selections to the processor 703 and for controlling cursor movement on the display 711.

According to an embodiment of the invention, the processes described herein are performed by the computer system 700, in response to the processor 703 executing an arrangement of instructions contained in main memory 705. Such instructions can be read into main memory 705 from another computer-readable medium, such as the storage device 709. Execution of the arrangement of instructions contained in main memory 705 causes the processor 703 to perform the process steps described herein. One or more processors in a multi-processing arrangement may also be employed to execute the instructions contained in main memory 705. In alternative embodiments, hard-wired circuitry may be used in place of or in combination with software instructions to implement the embodiment of the invention. Thus, embodiments of the invention are not limited to any specific combination of hardware circuitry and software.

The computer system 700 also includes a communication interface 717 coupled to bus 701. The communication interface 717 provides a two-way data communication coupling to a network link 719 connected to a local network 721. For example, the communication interface 717 may be a digital subscriber line (DSL) card or modem, an integrated services digital network (ISDN) card, a cable modem, a telephone modem, or any other communication interface to provide a data communication connection to a corresponding type of communication line. As another example, communication interface 717 may be a local area network (LAN) card (e.g. for Ethernet™ or an Asynchronous Transfer Model (ATM) network) to provide a data communication connection to a compatible LAN. Wireless links can also be implemented. In any such implementation, communication interface 717 sends and receives electrical, electromagnetic, or optical signals that carry digital data streams representing various types of information. Further, the communication interface 717 can include peripheral interface devices, such as a Universal Serial Bus (USB) interface, a PCMCIA (Personal Computer Memory Card International Association) interface, etc. Although a single communication interface 717 is depicted in FIG. 7, multiple communication interfaces can also be employed.

The network link 719 typically provides data communication through one or more networks to other data devices. For example, the network link 719 may provide a connection through local network 721 to a host computer 723, which has connectivity to a network 725 (e.g. a wide area network (WAN) or the global packet data communication network now commonly referred to as the "Internet") or to data equipment operated by a service provider. The local network 721 and the network 725 both use electrical, electromagnetic, or optical signals to convey information and instructions. The signals through the various networks and the signals on the network link 719 and through the communication interface 717, which communicate digital data with the computer system 700, are exemplary forms of carrier waves bearing the information and instructions.

The computer system 700 can send messages and receive data, including program code, through the network(s), the network link 719, and the communication interface 717. In the Internet example, a server (not shown) might transmit requested code belonging to an application program for implementing an embodiment of the invention through the network 725, the local network 721 and the communication interface 717. The processor 703 may execute the transmitted code while being received and/or store the code in the storage device 709, or other nonvolatile storage for later execution. In this manner, the computer system 700 may obtain application code in the form of a carrier wave.

The term "computer-readable medium" as used herein refers to any medium that participates in providing instructions to the processor 703 for execution. Such a medium may take many forms, including but not limited to non-volatile media, volatile media, and transmission media. Non-volatile media include, for example, optical or magnetic disks, such as the storage device 709. Volatile media include dynamic memory, such as main memory 705. Transmission media include coaxial cables, copper wire and fiber optics, including the wires that comprise the bus 701. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
monitoring traffic during a configurable time interval at a node;
shaping bursts associated with the traffic according to associated burst lengths, wherein each associated burst length is an amount of traffic stored to a buffer of a shaper of the node during a subinterval of the configurable time interval;
tracking number of shaped bursts;
generating a measured traffic rate based on the number of shaped bursts occurring within the configurable time interval; and
determining whether the measured traffic rate exceeds a committed rate,
wherein each associated burst length is determined based on an amount of traffic received by the node during the subinterval, an amount of traffic stored to the buffer during a previous subinterval, and an amount of traffic to be released from the buffer during the subinterval.

2. A method according to claim 1, wherein the committed rate is specified in a service level agreement associated with a subscriber, the method further comprising:
determining statistics for the shaped bursts;
generating a bursty traffic report using the statistics; and
transmitting the bursty traffic report to the subscriber.

3. A method according to claim 1, wherein the tracking step includes:
counting number of bytes corresponding to the bursts.

4. A method according to claim 1, further comprising:
determining a maximum excess byte count based on the bursts.

5. A method according to claim 1, wherein the configurable time interval has a granularity in order of either a microsecond or a millisecond.

6. A method according to claim 1, wherein the traffic is a flow of one or more data units corresponding to blocks, cells, frames, or packets.

7. A method comprising:
monitoring traffic during a configurable time interval at a node;
shaping bursts associated with the traffic according to associated burst lengths, wherein each associated burst length is an amount of traffic stored to a buffer of a shaper of the node during a subinterval of the configurable time interval;
tracking number of shaped bursts;
generating a measured traffic rate based on the number of shaped bursts occurring within the configurable time interval; and
determining whether the measured traffic rate exceeds a committed rate,
wherein individual data units of the traffic are associated with corresponding subintervals of the configurable time interval and the individual data units have corresponding lengths, the method further comprising:
grouping particular data units corresponding to a same subinterval into a group;
summing lengths of the particular data units of the group; and
subtracting a predetermined amount from summation,
wherein an excess length from subtraction corresponds to a burst length for the same subinterval.

8. A method according to claim 7, wherein the excess length is added to summation of lengths of particular data units grouped to a subsequent same subinterval for determining burst length for the subsequent same subinterval.

9. A method according to claim 1, further comprising:
mapping the measured traffic rate to a corresponding frequency of occurrence;
determining an active traffic period based on one or more mappings; and
determining an average active traffic rate based on the active traffic period.

10. An apparatus comprising:
an interface configured to monitor traffic during a configurable time interval at a node and to shape bursts associated with the traffic according to associated burst lengths, wherein each associated burst length is an amount of traffic stored to a buffer of a shaper of the node during a subinterval of the configurable time interval; and
a processor configured to track number of shaped bursts associated with the traffic, to generate a measured traffic rate based on the number of shaped bursts occurring within the time configurable interval, and to determine whether the measured traffic rate exceeds a committed rate,
wherein each associated burst length is determined based on an amount of traffic received by the node during the subinterval, an amount of traffic stored to the buffer during a previous subinterval, and an amount of traffic to be released from the buffer during the subinterval.

11. An apparatus according to claim 10, wherein the committed rate is specified in a service level agreement associated with a subscriber, the apparatus further comprising:

a communication interface configured to determine statistics for the shaped bursts, to generate a bursty traffic report using the statistics, and to transmit the bursty traffic report to the subscriber.

12. An apparatus according to claim 10, wherein the processor is further configured to count number of bytes corresponding to the bursts when tracking number of bursts.

13. An apparatus according to claim 10, wherein the processor is further configured to determine a maximum excess byte count based on the bursts.

14. An apparatus according to claim 10, wherein the configurable time interval has a granularity in order of either a microsecond or a millisecond.

15. An apparatus according to claim 10, wherein the traffic is a flow of one or more data units corresponding to blocks, cells, frames, or packets.

16. An apparatus comprising:
an interface configured to monitor traffic during a configurable time interval at a node and to shape bursts associated with the traffic according to associated burst lengths, wherein each associated burst length is an amount of traffic stored to a buffer of a shaper of the node during a subinterval of the configurable time interval; and
a processor configured to track number of shaped bursts associated with the traffic, to generate a measured traffic rate based on the number of shaped bursts occurring within the time interval, and to determine whether the measured traffic rate exceeds a committed rate,
wherein individual data units of the traffic are associated with corresponding subintervals of the configurable time interval, and individual data units have corresponding lengths, the processor is further configured to group particular data units corresponding to a same subinterval into a group, to sum lengths of the particular data units of the group, and to subtract a predetermined amount from summation, wherein an excess length from subtraction corresponds to a burst length for the same subinterval.

17. An apparatus according to claim 16, wherein the excess length is added to sum of lengths of particular data units grouped to a subsequent same subinterval for determining burst length for the subsequent same subinterval.

18. An apparatus according to claim 10, wherein the processor is further configured to map the measured traffic rate to a corresponding frequency of occurrence, to determine an active traffic period based on one or more mappings, and to determine an average active traffic rate based on the active traffic period.

19. A system comprising:
a traffic module configured to monitor traffic during a configurable time interval at a node and to shape bursts associated with the traffic according to associated burst lengths, wherein each associated burst length is an amount of traffic stored to a buffer of a shaper of the node during a subinterval of the configurable time interval; and
a server configured to track number of shaped bursts associated with the traffic, to generate a measured traffic rate based on the number of shaped bursts occurring within the time configurable interval, and to determine whether the measured traffic rate exceeds a committed rate,
wherein each associated burst length is determined based on an amount of traffic received by the node during the subinterval, an amount of traffic stored to the buffer during a previous subinterval, and an amount of traffic to be released from the buffer during the subinterval.

20. A system according to claim 19, wherein the server is further configured to filter the bursts according to associated lengths and to determine statistics for the filtered bursts, to generate a bursty traffic report using the statistics, and to transmit the bursty traffic report to a subscriber.

21. A system according to claim 20, further comprising:
a repository configured to store service level agreements of subscribers including the committed rate of service.

22. A system according to claim 19, wherein the server is further configured to count number of bytes corresponding to the bursts when tracking number of bursts and to determine a maximum excess byte count based on the bursts.

23. A system according to claim 19, wherein the configurable time interval has a granularity in order of either a microsecond or a millisecond.

* * * * *